United States Patent
Null

[19]

[11] Patent Number: 6,130,663
[45] Date of Patent: Oct. 10, 2000

[54] TOUCHLESS INPUT METHOD AND APPARATUS

[76] Inventor: Nathan D. Null, 3500 Bullock La. #39, San Luis Obispo, Calif. 93401

[21] Appl. No.: 08/903,580

[22] Filed: Jul. 31, 1997

[51] Int. Cl.[7] .................................................. G09G 5/08
[52] U.S. Cl. .................. 345/158; 178/18.04; 178/18.09; 345/156; 345/175
[58] Field of Search ..................................... 345/158, 156, 345/157, 177, 166, 173, 175; 178/18.09, 18.02, 18.04, 19.05

[56] References Cited

U.S. PATENT DOCUMENTS

| | | | |
|---|---|---|---|
| 3,613,066 | 10/1971 | Cooreman | 178/18.09 |
| 4,012,588 | 3/1977 | Davis et al. | 178/18.04 |
| 4,294,543 | 10/1981 | Apple et al. | 178/18.09 |
| 4,550,250 | 10/1985 | Mueller et al. | 250/203 |
| 4,568,182 | 2/1986 | Modjallal | 178/18.09 |
| 4,688,933 | 8/1987 | Lapeyre | 345/175 |
| 4,782,328 | 11/1988 | Denlinger | 345/175 |
| 5,059,959 | 10/1991 | Barry | 340/709 |
| 5,227,985 | 7/1993 | Dementhon | 345/158 |
| 5,248,856 | 9/1993 | Mallicoat | 178/18.09 |
| 5,288,078 | 2/1994 | Capper et al. | 273/148 |
| 5,424,756 | 6/1995 | Ho et al. | 345/158 |
| 5,444,462 | 8/1995 | Wambach | 345/158 |
| 5,453,759 | 9/1995 | Seebach . | |
| 5,489,922 | 2/1996 | Zloff | 345/156 |
| 5,502,459 | 3/1996 | Marshall et al. | 345/158 |
| 5,514,861 | 5/1996 | Swartz et al. | 235/472 |
| 5,521,616 | 5/1996 | Capper et al. | 345/156 |
| 5,525,764 | 6/1996 | Junkins et al. | 345/156 |

*Primary Examiner*—Jeffery A. Hofsass
*Assistant Examiner*—John Tweel, Jr.
*Attorney, Agent, or Firm*—Leo F. Costello

[57] ABSTRACT

Touchless activation of a controlled element, such as a graphic element of a computer display, is provided in any one or more of several dimensions of multi-dimensional coordinate system on the display, in response to the presence of a controlling object, such as a finger, in a predetermined field of free space separate from the element. The field is cyclically optically, angularly scanned in timed relationship with the cyclic generation and counting of timing signals. The scanning causes energy in the field that is reflected from the object to produce triggering signals during each cycle of the scan. The time each triggering signal is received is a function of the angle traversed by the scan from the start of the scan until an object is intercepted. These triggering signals are then used to interrupt the counting of the timing signals, whereby the counted values represent the angles. By triangulation, these angles are then converted into the coordinates of the object, and such coordinates are converted into control signals that are applied to the display to activate the graphic element or other controlled element. The system thus enables 3-D activation of the controlled element.

21 Claims, 9 Drawing Sheets

TOUCHLESS INPUT METHOD AND APPARATUS

FIELD OF THE INVENTION

The present invention pertains to a touchless input method and apparatus and more particularly to a method and apparatus for the accurate touchless activation of a graphic element of a display in multiple dimensions in response to the presence of an object in a field of free space separate from the display.

BACKGROUND

Although having wider application, the subject invention has particular utility for activating a pointer, cursor, or other on-screen symbol or element, such as an arrowhead, on a computer display. Use of the term "cursor" in the context of the subject invention needs clarification. The *Computer Dictionary*, Second Edition, 1994, by Microsoft Press defines a cursor as a blinking underline or rectangle, or a blinking vertical bar that marks the place where keystrokes appear when typed. This dictionary also recognizes that the term cursor or pointer may refer to the arrow or other on-screen icon that moves with movements of the mouse, and it is in this latter context that the term "cursor" is used herein.

Accurate and precise computer control with a cursor or pointer is of course necessary, and there are many devices available that provide such control. These known devices provide a direct, or touch-type, input to the computer for positioning and otherwise activating the mouse, they including the mouse, joystick, light pin, CRT touch screen and the keyboard. Such devices are very functional, but they rely on direct cable-connection to the computer.

Computer control without the such direct physical contact and cable connection, that is, touchless control, is also desirable and is known, but the systems that have been proposed have disadvantages that compromise the necessary accuracy and precision. These known systems involve computer-control by a user's finger or hand moving in free space apart from the computer. Examples of known touchless systems are disclosed in the U.S. Pats. Nos. 4,524,348 to Lefkowitz; 5,059,959 to Barry; and 5,288,078 to Capper et al.

The Lefkowitz apparatus relies on a user's hand to change the capacitance in a radio frequency oscillator to control the display. Thus, electrically inert objects will not be detected. Also, radio frequencies may require expensive components and may be subject to governmental restrictions.

The Capper et al. device uses IR emission, reflection and reception to provide an analog or on-off response to near-field objects. With multiple emitters, three coordinates of an object in free space can be generated. Although this apparatus avoids the expensive components of Lefkowitz and provides a response from most objects, it does not yield the accuracy and consistency necessary for most personal computers and other applications. Capper et al.'s reliance on light intensity to determine distances and the probable use of imperfect components are deficiencies. Dependence on light intensity will cause objects to have different reflective signatures, and imperfect components will cause movements of an object to be extenuated or attenuated so that only a relative position can be obtained. Moreover, the use of better components and the incorporation of lenses and special circuitry may still not solve these problems.

Barry's method and apparatus allow a user to position a cursor on the screen of a computer display by moving a finger in a field of transmitted signals of acoustic or electromagnetic energy. These signals reflect off the finger and return to receivers, similar to range-finding systems using sonar, radar or IR. The system determines the x, y coordinates of an object in space but not a z coordinate. Moreover, the disadvantages of high frequencies exist as discussed above.

SUMMARY

The present invention enables touchless activation of a controlled element, such as a graphic element of a computer display, in any one or more of several dimensions of multi-dimensional coordinate system on the display, in response to the presence of a controlling object, such as a finger, in a predetermined field of free space separate from the element. The field is cyclically optically, angularly scanned in timed relationship with the cyclic generation and counting of timing signals. The scanning causes energy in the field that is reflected from the object to produce triggering signals during each cycle of the scan. The time each triggering signal is received is a function of the angle traversed by the scan from the start of the scan until an object is intercepted. These triggering signals are then used to interrupt the counting of the timing signals, whereby the counted values represent the angles. By triangulation, these angles are then converted into the coordinates of the object, and such coordinates are converted into control signals that are applied to the display to activate the graphic element or other controlled element. The system thus enables 3-D activation of the controlled element.

An object of this invention is to provide touchless activation of a controlled element, such as a graphic element of a computer display, in an accurate and precise manner in accordance with the position and movement in free space of a controlling object, such as a user's finger.

Another object is to activate a controlled element, such as a graphic element of a display, in any one or more of several dimensions of a multi-dimensional coordinate system in response to the presence of a controlling object, such as a finger, in a predetermined field of free space separated from the element.

An additional object is to activate a graphic symbol of a display in x, y, and z dimensions of a 3-D coordinate system on the display is response to movements of an object, such as a finger, in corresponding x, y and z dimensions of a 3-D coordinate system in free space apart from the display.

Yet another object is to use angular sweeping scans of a field to achieve digital responses for greater accuracy in activating a controlled element in response to a controlling element in the field.

A further object is to enable touchless control of the cursor on a computer display.

Still another object is to enable the control of a cursor on a computer display without the use of a mouse, joystick, light pen, CRT touch screen or keyboard.

Yet another object is to provide touchless control a graphic element, such as the cursor, of a computer display without the use of high frequencies and their expensive components.

A still further object is to provide touchless control of a cursor on a computer display without regard to whether the controlling element is electrically active or inert.

An additional object is to provide touchless control of a cursor on a computer display by many different objects, such as the operator's finger, by a pen or pencil, by a special wand, or by most other objects, without regard to the reflective signature of the object.

Yet another object is to use digital signals to indicate the presence and location of an object movable in free space and thereby control the activation of an element separate from the object, such as a graphic element of a display, whereby the inaccuracies associated with using analog signals are avoided.

A still further object is to provide an apparatus for the touchless control of a cursor on a computer display that can be positioned in front of the keyboard between the keyboard and the display but may also be positioned in many other convenient locations and orientations.

Another object is to provide touchless control for the cursor of a computer display that provides smooth, gliding cursor control, that is easy to install on most home computers, is user friendly for multiple users, and is low in cost.

An additional object is to provide a touchless input apparatus that can be used not only to control a graphic display symbol but has many other applications such as monitoring the position of near-field objects, for example, mice in cages, pinballs in pinball machines, packages on conveyor belts, and the like.

A still further object is to provide a touchless input apparatus that is capable of calculating the location of near-field objects based on triangulation from signals produced by the apparatus that are representative of angles of a triangle including the object and a pair of reference points relatively adjacent to the object.

Yet another object is to use various forms of radiant energy and in various ways in a scanner to produce signals representative of the angles as aforesaid.

These and other objects, features, and advantages of the present invention will become apparent upon reference to the following description, accompanying drawings, and appended claims.

DETAILED DESCRIPTION

Figure 1:
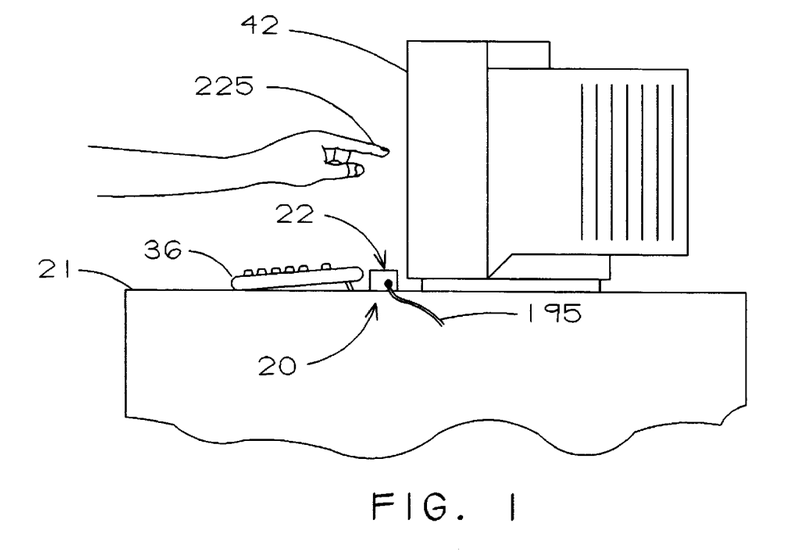
FIG. 1 is a side elevation of computer work station showing a computer monitor or display on a desk top, a keyboard in front of the monitor, and the scanner of the present invention in one of its many possible positions, namely between the monitor and the keyboard, and also showing where a user's finger would be positioned to control a graphics display-element on the computer while using the subject method and apparatus.
Figure 2:
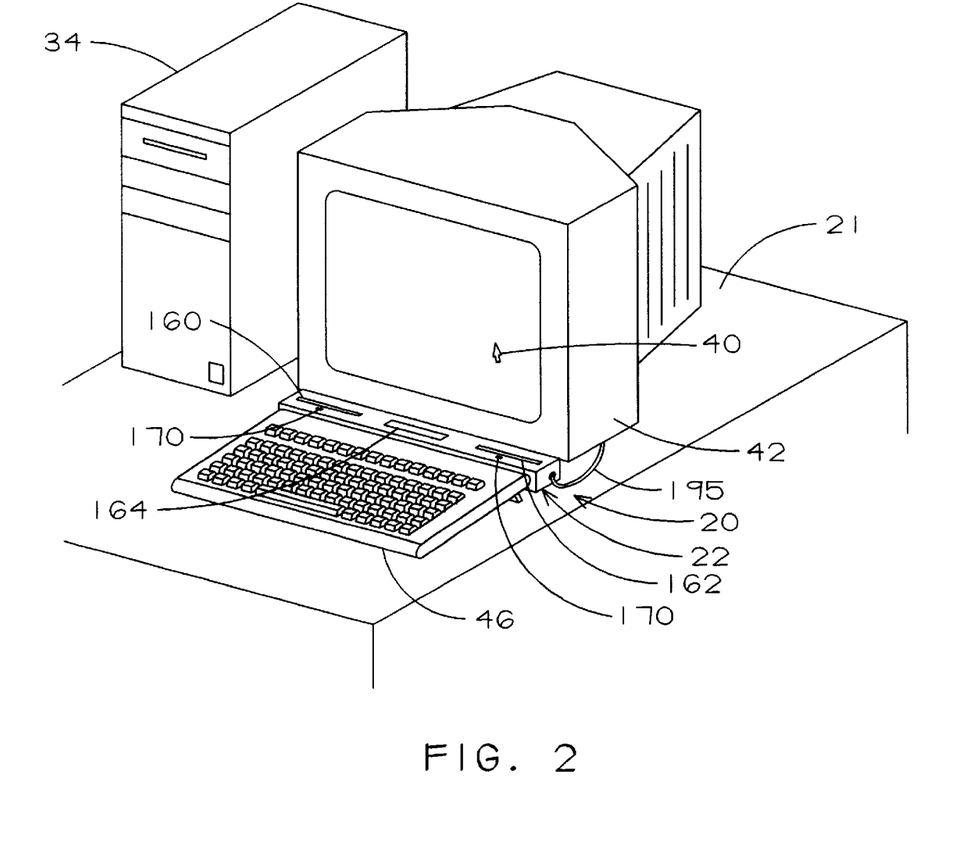
FIG. 2 is a front isometric view of the computer monitor, the keyboard, and the scanner shown in FIG. 1, plus a computer tower, all on the desk top.
Figure 3:
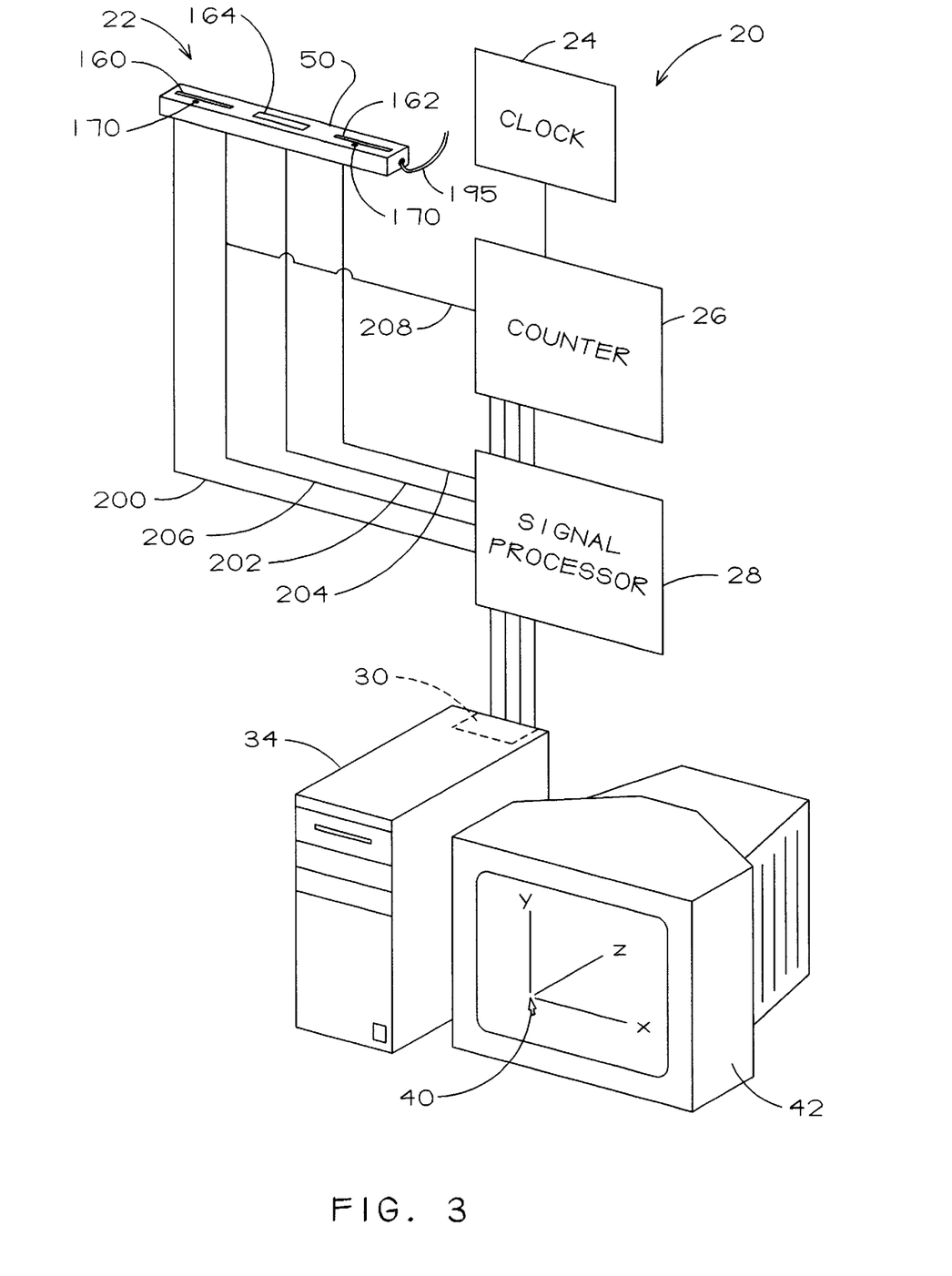
FIG. 3 is an isometric view of the computer monitor, the computer tower and the scanner of FIG. 2, together with schematic views of a clock, a counter and a signal processor, all of which are part of the subject apparatus.

With reference to FIGS. 1 through 3, an embodiment of the apparatus of the present invention is the cursor control apparatus generally indicated by the numeral 20 in these figures and shown on a desk top 21. The cursor control apparatus includes an electro-optical scanner 22, an astable timing clock or multivibrator circuit 24 (FIG. 3) for producing trains of timing pulses, a counter 26 comprising well known digital circuitry for counting the pulses; a signal processor 28 that has logic, sorting, storing, and signal transmitting functions, also well known in the art; and a converter 30 that may be a separate unit or part of a microprocessor 34, as shown in FIG. 3. Also, the task of the converter may be incorporated in the scanner as "on-board logic." The converter incorporates software based upon trigonometric algorithms for making the necessary calculations in accordance with the present invention as will be described in more detail herein.

The particular application or purpose of the illustrated cursor control embodiment 20 of the present invention is to activate a cursor 40 of a display or monitor 42 (FIGS. 1–3) in a computer system that includes a keyboard 46. As is well known, the cursor is capable of being moved in x and y dimensions of a multidimensional coordinate system and can be activated in the z dimension although not moving in the z dimension. In a typical desktop computer setup, using a mouse to control the cursor, the movement of the cursor in x and y dimensions is achieved by rolling the track ball of the mouse on a mouse pad. Conventional activation of the cursor in the z dimension is achieved by clicking the buttons on the mouse. As contrasted with such hand manipulation of a mouse, the subject invention achieves x, y, and z activation of the cursor in a touchless manner, as will be described.

The scanner 22 generally illustrated in FIGS. 1 through 3 is shown in more detail in FIGS. 4 through 8. The scanner has an enclosed rectangular housing or cabinet 50 providing a pair of spaced parallel side walls 52 and 54, spaced parallel end walls 56 and 58, a bottom wall 60, and a cover 62 parallel to the bottom wall. A shaft 66 extends lengthwise in the housing and is rotatably mounted on support plates 68 in bearings not specifically shown. As such, the shaft has opposite left and right ends 70 and 72 relatively adjacent to the end walls 56 and 58, respectively, of the housing. The expressions "left" and "right" are used herein only for descriptive convenience and are not limitations on the position of use of the apparatus.

Figure 6:
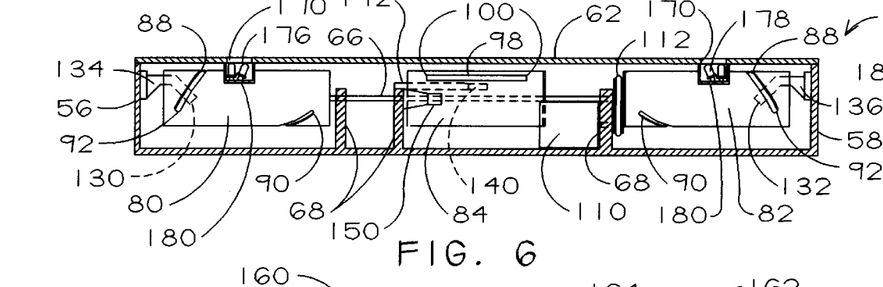
FIG. 6 is a longitudinal vertical cross-section of the scanner taken along line 6—6 in FIG. 7.
Figure 7:
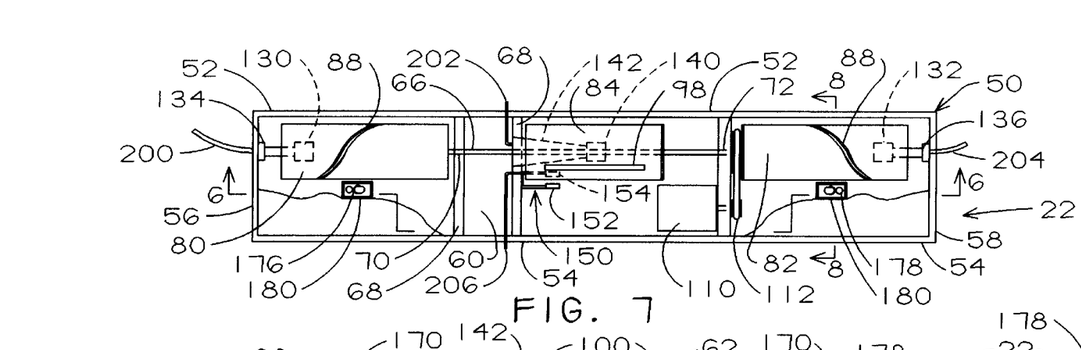
FIG. 7 is a top plan view of the scanner with its cover broken away to show the interior of the scanner.
Figure 8:
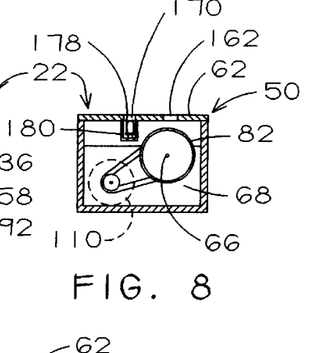
FIG. 8 is a transverse cross-section taken along line 8—8 in FIG. 7.

Left, right, and center scanning cylinders or cylindrical blinders 80, 82, and 84 (FIGS. 4, 6 through 8) are mounted on the shaft 66 for rotation therewith. As best shown in FIGS. 6 and 7, the left scanning cylinder is located on the left end 70 of the shaft between the left end wall 56 and the left-most support plate 68; the center scanning cylinder 84 is located at the center of the shaft between the ends 70 and 72 thereof and between the intermediate and right support plates; and the right scanning cylinder 82 is located on the right end of the shaft between the right end wall 58 and the right support plate. Note that the ends 70 and 72 of the shaft terminate short of the outer ends of the left and right cylinders.

Each of the scanning cylinders 80, 82, 84 (FIGS. 4 and 6 through 8) is made of opaque material in the illustrated embodiment and has a hollow interior. The left and right cylinders have open outer ends, whereas at least one end of the center cylinder, the left end in the illustrated embodiment, has an open end. Each of the left and right scanning cylinders 80 and 82 has a narrow, generally helical, slot 88 that winds around its cylinder for approximately one turn and has opposite ends 90 and 92 that are respectively adjacent to the opposite ends of its cylinder. Each slot is described as "generally" helical since the ends of each slot diverge may slightly endwardly of its cylinder from a purely helical curve, as shown at one end of each cylinder in FIGS. 6 and 9a–d, for a purpose to be described. It is also to be noted that the opposed side edges of each slot are parallel with each other so that the slot is of substantially uniform width throughout its length.

The center cylinder 84 (FIGS. 6 and 7) has a narrow, straight center slot 98 extending lengthwise thereof with its opposite ends 100 terminating adjacent to the opposite ends of the center cylinder. Again, the opposed side edges of this slot are substantially parallel to each other so that the center slot is of substantially uniform width throughout its length. It is also to be noted that the center slot is parallel to the axis of the center cylinder and thus to the shaft 66.

As shown and described (FIGS. 6 and 8), the shaft 66 is positioned in the housing 50, and the cylinders are mounted on the shaft so that the cylinders are in peripherally, closely spaced, parallel relation to the cover 62 of the housing 50. An electric motor 110 is mounted on the bottom wall 60 of and within the housing 50 inwardly adjacent to the right support plate 68 and is connected to the shaft 66 by a pulley and belt drive mechanism 112. As will be understood, operation of the motor rotates the shaft 66 and thus the scanning cylinders 80, 82, and 84; the direction of rotation in the illustrated embodiment is shown by the curved arrows in FIGS. 9a–9d and 10.

Left and right IR detectors 130 and 132 (FIGS. 4, 6, and 7) are mounted by end brackets 134 and 136 on the opposite end walls 56 and 58, respectively, of the housing 50 so as to be positioned within the open outer ends of the left and right scanning cylinders 80 and 82, respectively. Each of the left and right detectors is disposed within its cylinder at approximately the axis thereof and so as to be directed upwardly toward the cover 62 in angular relation thereto, preferably at an approximately forty-five degree angle to the cover.

Figure 13:
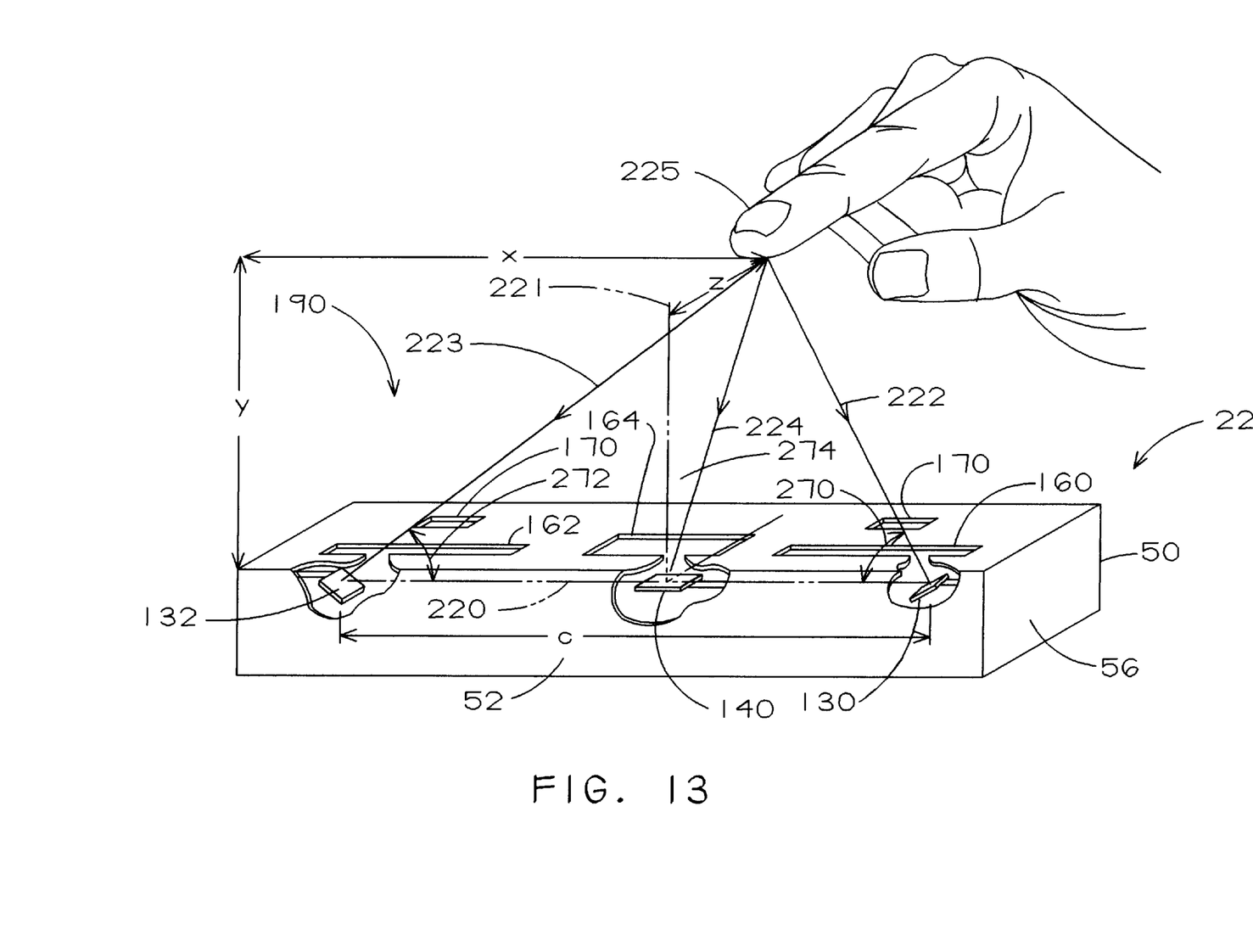
FIG. 13 is an enlarged rear schematic isometric view of the scanner (for illustrative convenience reversed end-for-end from its position in FIGS. 1 through 12) with parts broken away to show how radiation is reflected to detectors in the scanner from a user's finger and also indicating the angles measured by the scanner.

A center detector 140 (FIGS. 4, 6, and 7) is mounted centrally within the center scanning cylinder 84 by a center bracket 142. This bracket is secured to the left-most intermediate support plate 68 and extends through the left open end of the center cylinder. The center bracket positions the center detector just above the shaft 66 in the approximate center of the center cylinder and so that the center detector faces the cover 62 in generally parallel relation thereto. All three detectors 130, 132, and 140 lie along a common reference line 220 (FIG. 13).

In addition, a rotational sensor 150 (FIGS. 4, 6, and 7), including an emitter 152 and receiver 154 combination, is also mounted on the left-most intermediate support plate 68. The center cylinder is sandwiched between but spaced from the emitter and receiver which are in overlapping relation to the center slot 98. The receiver is on the inside of the center cylinder, and the emitter is on the outside thereof, but these may be reversed. The emitter and receiver of the rotational sensor 150 face each other, but the center cylinder blocks the receiver from receiving emissions from the emitter except when the center slot is aligned with the emitter and receiver.

Figure 4:
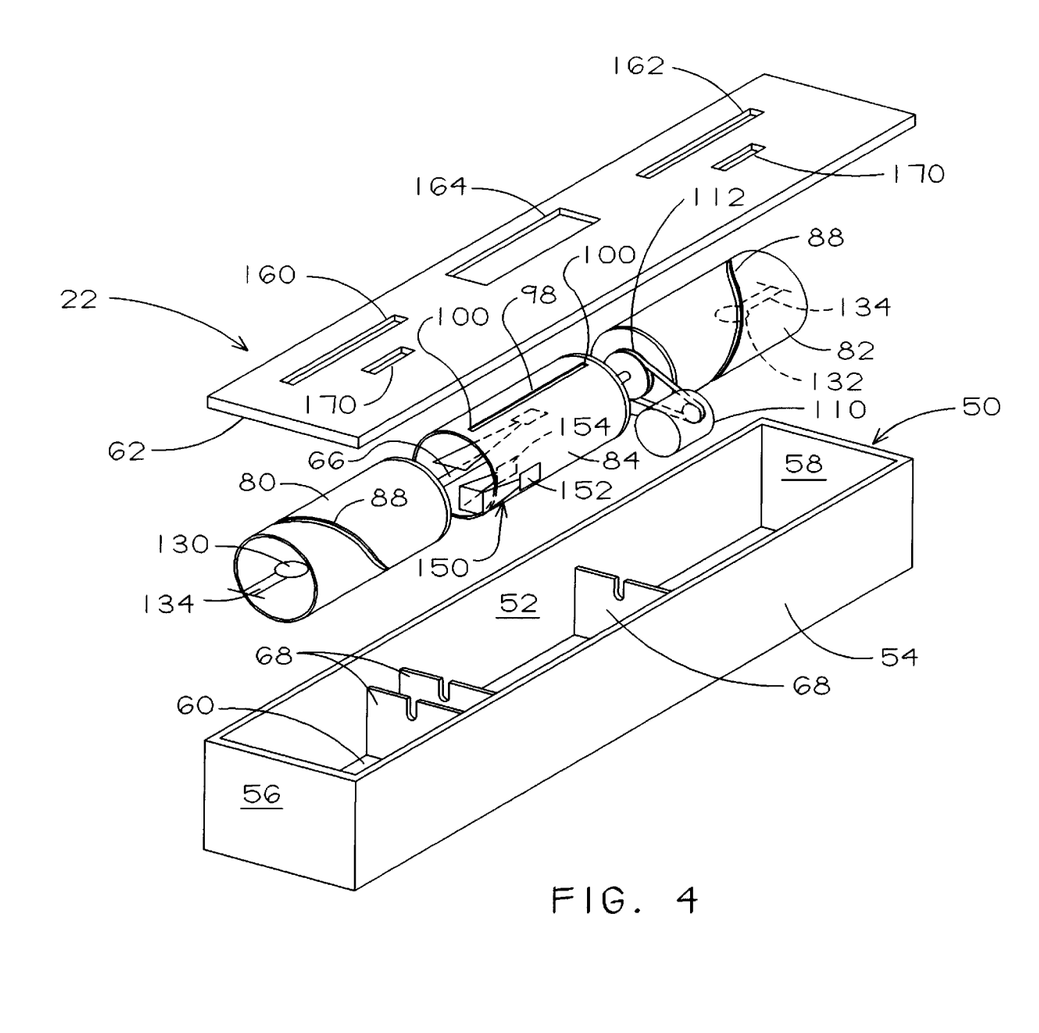
FIG. 4 is an enlarged, exploded isometric view of the scanner of the present invention.
Figure 5:
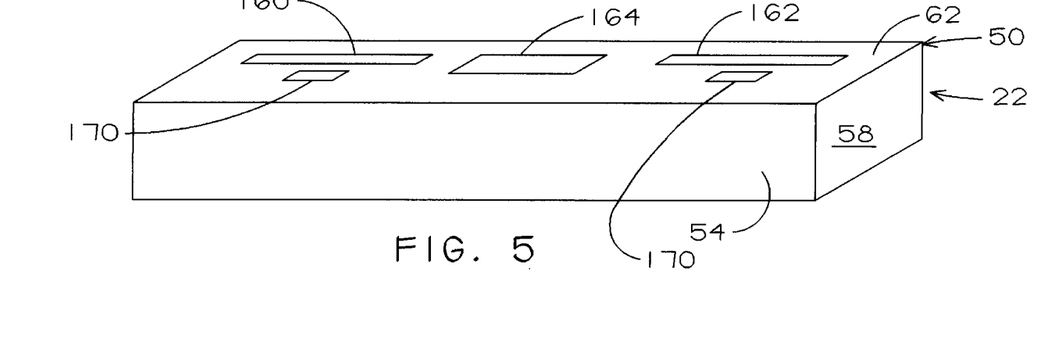
FIG. 5 is a still further enlarged isometric, exterior view of the scanner housing.

With particular reference to FIGS. 4 and 5, the cover 62 of the housing 50 includes elongated, left, right, and center receiving apertures 160, 162, and 164, respectively. These apertures are rectangular and extend in substantial alignment lengthwise of the cover respectively adjacent to the left, right, and center scanning cylinders 80, 82, and 84. The left and right apertures are relatively narrow in width, whereas the center aperture is wider. Each of these apertures is of the approximately same length as its respectively adjacent scanning cylinder. As best shown in FIGS. 4 and 9a–d, the left and right receiving apertures respectively angularly or transversely overlap the left and right slots 88 in the left and right scanning cylinders at all times. FIGS. 4 and 10 show that the center aperture is in opposed or overlapping but parallel relationship to the center slot 98 once during each complete rotation of the center cylinder.

As described and assembled, the relationship of the apertures 160 and 162, the slots 88 and the detectors 130 and 132 allows the detectors only a narrow sweeping view, but at all times, along the lines of sight 222 and 223 outwardly from the housing 50 (FIGS. 9a through 9d). On the other hand, the relationship of the aperture 164, the slot 98 and the detector 140 allows a wide sweeping view, during only a fraction of each revolution, along the line of sight 224 outwardly from the housing.

The cover 62 (FIGS. 2 through 6, 11, and 13) also has a pair of rectangular emission openings 170 respectively adjacent to the opposite end walls 56 and 58 of the housing 50 and thus adjacent to the left and right receiving apertures 160 and 162. Left and right infra-red emitters 176 and 178 are mounted on, but under, the cover 62 by brackets 180. When these emitters are energized, they project IR emission through the openings 170 upwardly from the housing 50.

Figure 11:
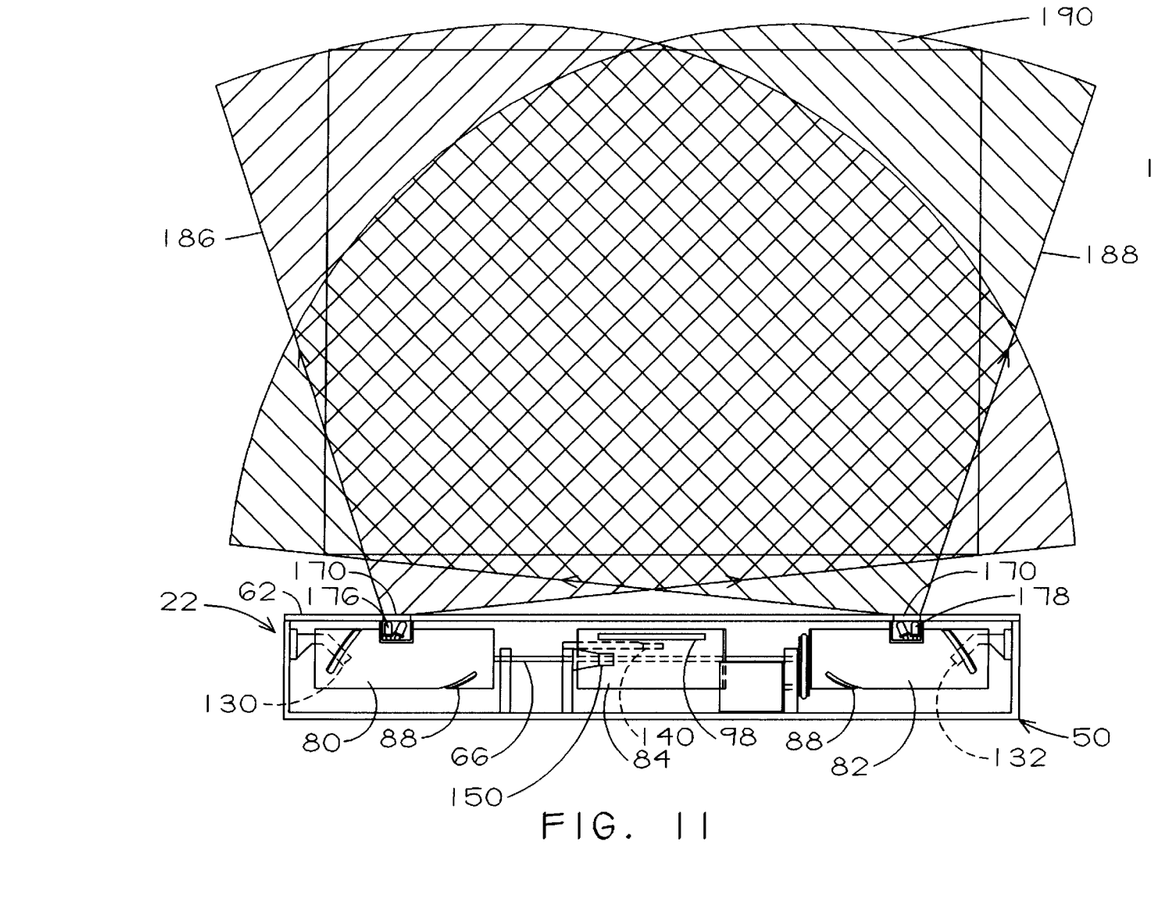
FIG. 11 is a view similar to FIG. 6 but additionally showing a representation in front elevation of the field of infra-red radiation produced by IR emitters in the scanner and also showing how the emissions from these emitters overlap.
Figure 12:
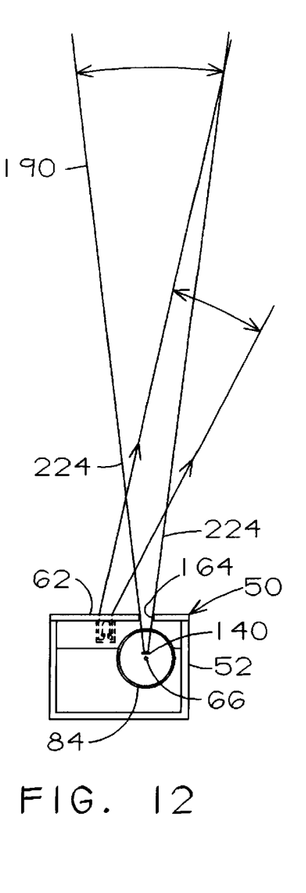
FIG. 12 is a view similar to FIG. 8 but showing a representation in side elevation of the field of radiation shown in FIG. 11 and the field of view of the center sensor.

Each of the left and right emitters is shown as a dual emitter, and these emitters are capable of projecting left and right beams 186 and 188 of IR energy (FIG. 11), each extending throughout slightly more than a ninety degree angle. These beams create a combined, generally rectangular field 190 of IR energy in a generally common plane extending upwardly from the housing and lengthwise thereof (FIGS. 11 and 12). Preferably, the emitters project modulated IR frequencies to which the detectors respond, thereby to reduce external noise and avoid false signals from other than a finger 225 or other controlling object.

The effective field 190 formed by the IR emitters 176 and 178 is adjacent to the housing but may extend above the housing 50 a distance of about one meter but not so high as to reach the ceiling of rooms in which the apparatus 20 is used. The effective length of the field is, as stated, approximately the length of the scanner 22 (FIG. 11). The width or depth of the field (FIG. 12) diverges upwardly from the emission openings 170 so that the effective field encompasses the width of the housing at usable distances above the housing, as shown in FIGS. 1, 12, and 13. FIG. 12 illustrates how adjustment of the emission beam width blocks unwanted reflections along line of sight 224 from the ceiling or other objects above the useful operating range of a user's finger. Reflections strong enough to produce strong signals in the detector 140 will be those received within the beam width. Thus, physical blocking of the emission, as well as amplification of the detectors and brightness of the reflection, control the depth of the field.

In other words, the depth of the field 190 produced by the scanner 22 is dependent on the intensity of the emissions from the emitters 176 and 178, more or less, and/or the amplification level of the detectors 130, 132, and 140. Depth of field can be truncated by offsetting, aiming, or shading these emitters so that their emissions fall only within a certain height above the scanner 22. All such field expanding and contracting methods can be made to be user friendly as required, such as a gain adjust on the amplifier to increase sensitivity. Field depth can also be adjusted electronically.

A power cord 195 (FIGS. 1 through 3) entering the housing 50 supplies electricity to the motor 110, the IR emitters 154, 176, and 178, and the detectors 130, 132, and 140, e.g., 9 vdc for the motor and emitters and 5.25 vdc for the emitters. Signal output conductors (FIGS. 3 and 7) are respectively shown at 200 between the left detector 130 and the signal processor 28; at 202 between the center detector 140 and the signal processor; at 204 between the right detector 132 and the signal processor; and at 206/208 between the receiver 154 of the rotational sensor 150 and the signal processor and the counter 26.

Figure 9A:
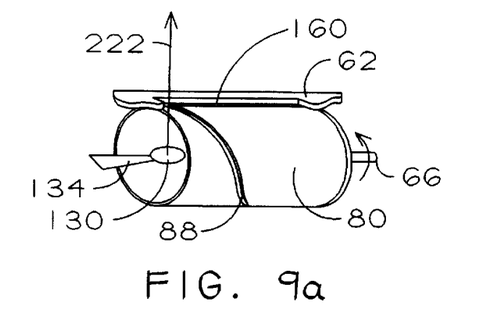
FIGS. 9a, 9b, 9c, and 9d are schematic, isometric views of the left scanning cylinder in the scanner of FIGS. 4, 6, and 7 and showing the cylinder in successive positions of rotation (in the direction of the curved arrow at the right) during each cycle of rotation thereof and further showing the line of sight (the straight arrow) of a sensor in the cylinder as the cylinder causes the line of sight to sweep through a scanning angle in one dimension lengthwise of the scanner in search of an object in the field being scanned.
Figure 9B:
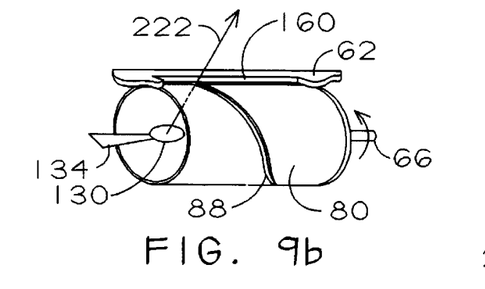
Figure 9C:
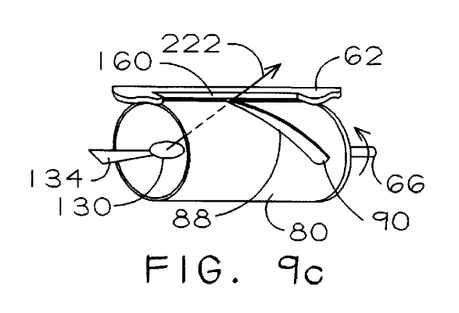
Figure 9D:
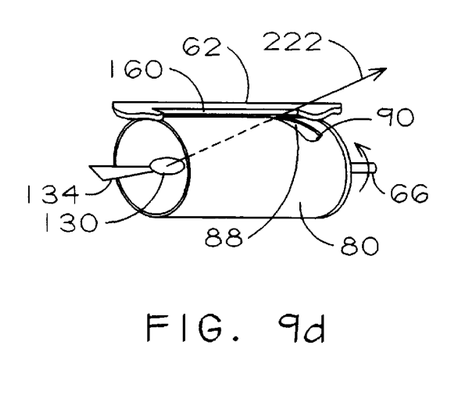
Figure 10:
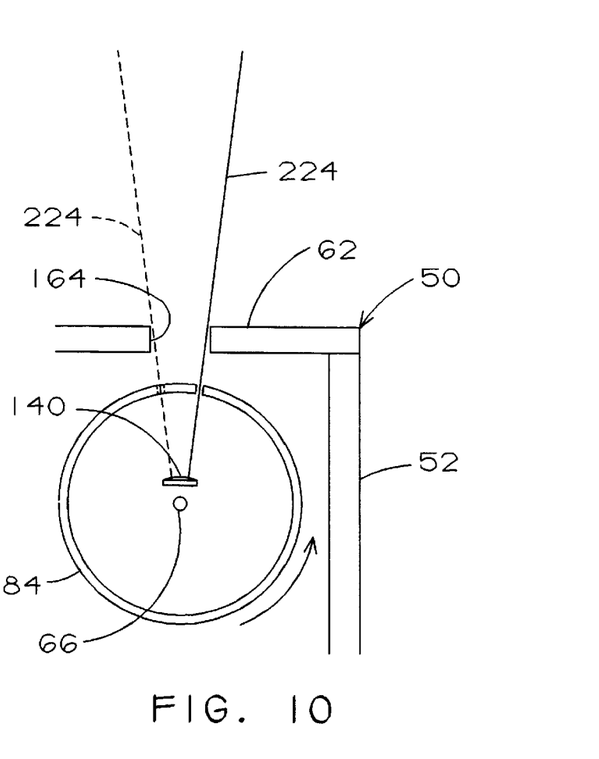
FIG. 10 is an enlarged schematic fragmentary end view of the center scanning cylinder showing the line of sight of a sensor in the cylinder as the cylinder causes the line of sight to sweep through a scanning angle in another direction transversely of the scanner in search of an object in the field being scanned.

With reference to FIGS. 9*a* through 9*d*, the left and right scanning cylinders 80 and 82 blind the view of their respective left and right IR detectors 130 and 132 of the IR field 190 except for narrow lines of sight 222 and 223, respectively, which extend from the detectors, through the slots 88 of their respective scanning cylinders, and thence through their respective receiving apertures 160 and 162 upwardly into the field 190. Each line of sight is scanned in generally the plane of the field through an angle of about ninety degrees during a single rotation of the respective scanning cylinder. Thus, during each such rotation, the left and right lines of sight are angularly scanned or swept through the length and height or x and y dimensions of the field from a generally vertical position, as generally shown in FIG. 9*a*, extending upwardly from the left and right sensors 130 and 132, to a position approaching a horizontal, as shown in FIG. 9*d*. As noted above, the ends of each helical slot depart somewhat from a purely helical path, as shown at the right in FIGS. 9*a*–9*d*, that is, extend slightly endwardly of its cylinder, to allow a greater range of sweeping of the line of sight.

Also, with reference to FIG. 10, the center scanning cylinder 84 blinds the view of the center IR detector 140 of the IR field 190 except when the center slot 98 is aligned with the center receiving aperture 164. During this alignment, the center detector is exposed to the field along the center line of sight 224 which then angularly scans the depth of the field from the rear to the front, as indicated by the rotational arrow, through an angle of about twenty degrees, ten degrees on each side of a vertical. Thus, during each revolution of the center scanning cylinder, the center line of sight scans the depth or z dimension of the field.

If an object, such as the user's finger (FIGS. 1 and 13) is positioned in the field 190, IR energy is reflected from the finger 225 along the lines of sight 222, 223, and 224 to the respective detectors 130, 132, and 140. Note that in FIG. 13, the scanner 22 is viewed from the opposite side from FIGS. 2 through 7 and 11 but that the same left and right nomenclature is retained, notwithstanding that these designations appear incorrect if applied only to FIG. 13.

Figure 15:
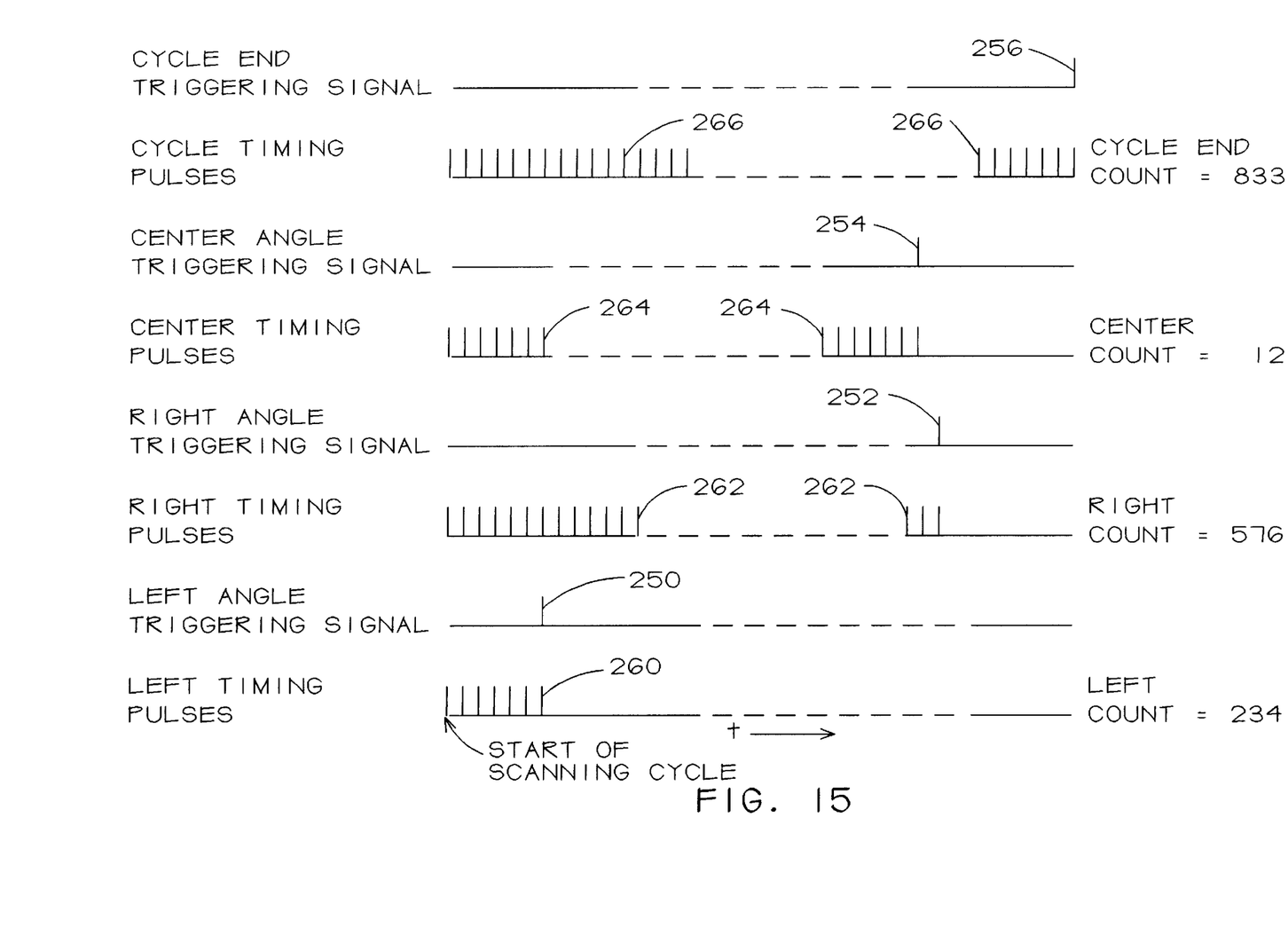
FIG. 15 is a timing diagram showing the relationship of the triggering signals produced by the scanner and the timing pulses generated by the clock, resulting in pulse counts corresponding to the angles measured by the scanner and showing examples of triggering signals and corresponding pulse counts.

When reflected energy 222, 223, 224 from the finger 225 (FIG. 13) strikes the detectors 130, 132, 140, the detectors produce triggering signals. FIG. 15 identifies a left-angle triggering signal 250, a right-angle triggering signal 252 and a center-angle triggering signal 254. As mentioned above, there is a rotational sensor 150, and this sensor produces a cycle-end triggering signal 256 at the end of each rotation of the shaft 66 and thus one complete rotation of each of the cylinders 80, 82, and 84. Assuming an object such as the finger 225 is in the field, four triggering signals are thus produced during each revolution of the cylinders.

The clock 24 (FIGS. 3 and 15) initiates timing pulses in synchronization with the start of rotation of each cycle of the scanning cylinders 80, 82, and 84. The counter 26 counts these pulses and generates trains of timing pulses 260, 262, 264, and 266 respectively associated with the detectors 130, 132, 140, and 154 and their respective triggering signals 250, 252, 254, and 256. The timing pulses are delivered to individual registers in the signal processor 28 where the respective pulse counts associated with the left, right, and center detectors are interrupted upon receipt of their respective triggering signals 250, 252, and 254. These counted values are then loaded into a logic holder in the signal processor. When the rotational sensor 150 is activated at the end of each revolution of the center cylinder 84, its triggering signal 256 is fed into the signal processor to interrupt its associated train of timing pulses. Thereupon, the cycle-end pulse count is also loaded into the logic holder and the counter is cleared for the next cycle through line 208. The logic holder of the signal processor then dumps these four time values in sequential order, namely, left-angle count, center-angle count, right-angle count, and cycle-end count to the converter 30 of the computer 34 whereupon the logic holder is cleared, and the cycle begins again.

The converter 30 is loaded with software using trigonometric algorithms capable of calculating the x, y, and z values based on the aforesaid time values and the distance between the sensors 130 and 132. These x, y, and z values of course correspond to the position and movement of the finger 225. The converter then uses this x, y, and z term to generate signals of the proper size and fit for activating the cursor 40 of the display 42.

OPERATION OF THE APPARATUS AND DESCRIPTION OF THE METHOD

The subject cursor control apparatus 20 (FIGS. 1 through 3 and 13) controls the activation, including positioning, of the graphic element or cursor 40 on the display 42 in response to the movement of the user's finger 225, or other object, in the free space defined by the field 190 of infra-red energy. The apparatus controls the cursor in x, y, and z dimensions of a multidimensional coordinate system on the display corresponding to the movements of the user's finger in x, y, and z dimensions of the separate multidimensional coordinate system within the field 190. As illustrated, the apparatus is conveniently used in association with a desktop computer 34 and display 42, with the scanner 22 conveniently located between the keyboard 36 and the display or monitor 42.

It is to be understood, however, that the invention is not limited to such association and location. The scanner 22 may be placed in various positions separate from the monitor 42 or desktop 21 and need not be positioned so as to generate a vertical field 190; that is, the orientation of the field can be at various angles and even horizontal. Furthermore, the scanner can be placed on the upper edge of the keyboard 46 or on a controller such as a joystick or trackball, not shown. For the purpose of describing the disclosed embodiment of the invention, however, it is assumed that the cursor control apparatus 20 is associated with a normal desktop computer 34, as shown in FIGS. 1 and 2.

The apparatus 20 is initially calibrated so that both of the left and right scanning cylinders 80 and 82 begin their cycle of rotation (i.e., time=0) with their respectively associated lines of sight 222 and 223 in upwardly directed generally vertical positions, as shown in FIG. 9a. Whether the position is exactly vertical is not critical as will be understood; in the illustrated embodiment, the starting position or time zero is slightly to the left of a precise vertical, as seen in FIGS. 9a and 11. One full revolution of the left and right scanning cylinders (or stated otherwise, the shaft 66) sweeps the left and right lines of sight through approximately ninety degree angles to approximately horizontal positions, again not precisely horizontal, as seen in FIG. 9d. What is important is that the lines of sight sweep through the area of the field 190 where the finger or other object 225 is located.

The apparatus 20 is also calibrated so that the center scanning cylinder 84 begins its cycle (i.e., time=0) with its associated line of sight 224 ten degrees to the rear of a vertical position, using the orientation of the illustrated embodiment and as particularly shown in a solid line in FIG. 10. The center line of sight continues to sweep forwardly to and through a vertical position to a sweep-ending position that is ten degrees past a vertical position. The total sweep angle, therefore, is twenty degrees in each one full revolution of the center scanning cylinder (that is, the shaft 66). This sweep angle is, again, sufficient to encompass the area of the field 190 where a finger or other object 225 is located.

The apparatus is further calibrated so that the clock 24 and counter 26 are synchronized so that each cycle of the trains of timing pulses 260, 262, and 264 start at time zero for the scans of the lines of sight 222, 223, and 224, as just explained. These timing relationships are shown in FIG. 15. Assuming, therefore, that power is applied to the apparatus, touchless control of the cursor is now described.

Users of the apparatus 20 merely point a finger 225 into the field 190, and a cursor 40 appears on the screen or display 42. That is, the user projects a finger, or other object, into the field 190, whereupon energy is reflected along the lines of sight 222, 223, and 224 (FIG. 13) to the detectors 130, 132, and 140. As a result, left-, right-, and center-triggering signals 250, 252, and 254 (FIG. 15) are respectively generated during each cycle of rotation of the scanning cylinders 80, 82, and 84. These triggering signals are fed to the signal processor 28 where they interrupt counting of their respective trains of timing pulses 260, 262, and 264. With reference to FIGS. 13 and 15, it will be understood that the pulse count associated with each left and right triggering signal is a function of the angle of incidence 270 and 272, respectively, between the reference line 220 (FIG. 13) and the associated reflected energy line 222 and 223, which is a complement of the angle traversed by its respective line of sight. The pulse count associated with the center triggering signal is a function of the angle 274 between the reference line 221 and the reflected energy line 224. In reading FIG. 13, it is to be remembered that it is a rear view but that the description thereof still retains the "left" and "right" terminology from FIGS. 1–12 although reversed in FIG. 13.

Thus, rotation of the left and right scanning cylinders 80 and 82 (FIGS. 11 and 13) sweeps the lines of sight 222 and 223 through their full range of about ninety degrees as above defined. The angle traversed by each line of sight 222 and 223 from its starting point until it reaches the finger 225 represents the amount of time elapsed from time zero until a reflection from the finger impinges a detector 130 or 132 so that the angle traversed, or its complement 270, 272, is proportional to this time. When the reflected energy strikes each detector, left and right triggering signals 250 and 252 are generated and fed to their respective counter registers in the signal processor 28 to produce left and right counts of timing pulses (FIG. 15) associated with the respective detectors.

Likewise, rotation of the center scanning cylinder 84 (FIGS. 10 and 13) sweeps the line of sight 224 in the field 190 from its starting position or time zero through its full range of about twenty degrees. The angle traversed by this line of sight from its time zero, or reference line 221, until it reaches the finger 225 represents the amount of time elapsed from time zero until a reflection from the finger impinges on center detector 140. The angle 274 traversed is proportional to the elapsed time. Activation of the center detection in this manner generates a center triggering signal 254 (FIG. 15) which is sent to the signal processor 28 to establish the center count.

The converter 30 in the computer 34 (FIG. 3) has the following data after each cycle of rotation of the scanning cylinders 80, 82, and 84 (FIGS. 10, 11, and 13), that is, after each sweep of the lines of sight 222, 223, and 224: count values for the left angle 270 (FIG. 15), the center angle 274, and the right angle 272; an end count generated by the rotational sensor 150; and a distance c (FIG. 13) between the left and right detectors or reference points 130 and 132, the latter being known in advance and programmed into the software loaded into the computer.

Since each sweep of each line of sight 222, 223, and 224 from its point of origin to its intersection with the finger 225 is a timed fraction of its total sweep time, the algorithms in the computer software are provided to calculate three angles. Those angles are a left angle 270 from the left pulse count (FIG. 15) and a right angle 272 from the right pulse count, both relative to the reference line 220 (FIG. 13), or in general, relative to the shaft 66 or rotational axis; and a center angle 274 from the center pulse count. Using these left and right angles and the known distance c (FIG. 13) between the detectors 130 and 132 or reference points, triangulation is performed by the computer software to determine the x and y positions of the finger or other reflective object 225. Having found the height to the finger through this triangulation method, the third or center angle 274 is used to calculate the depth or z dimension through triangulation, by assuming a ninety degree angle at the top of the z or depth triangle (FIGS. 13 and 14b), an assumption that yields acceptable results in view of the particular parameters. The result of this calculation is an x, y, and z term which is then sized, fitted and debugged by the converter software to activate the cursor 40 of the display 42.

EXAMPLE CALCULATION OF x, y, AND z

Assumptions.

1. Speed of rotation of the scanning cylinders 80, 82, and 84=six revolutions or cycles per second (in this example, therefore, the position of the cursor 40 is updated six times a second);

2. Distance c between detectors 130 and 132=thirty centimeters.

Figure 14A:
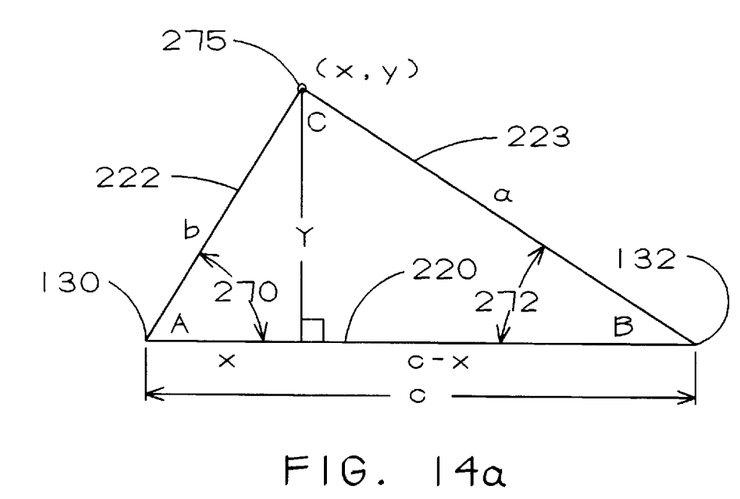
FIGS. 14a and 14b are diagrams helping to show how the x, y and z coordinates are calculated by triangulation from the angles measured by the scanner.
Figure 14B:
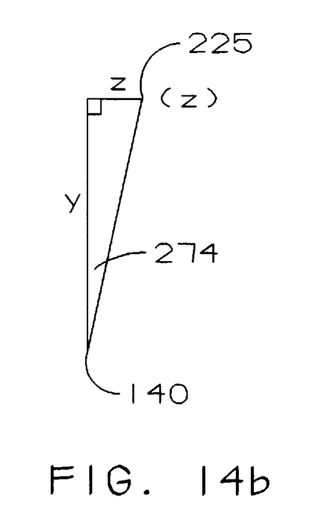
Figure 14C:
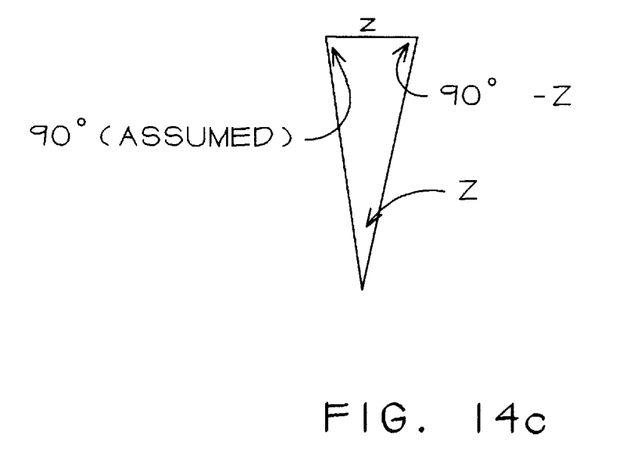

3. Sweep angle of the left and right lines of sight 222 and 223=ninety degrees (for example, the line of sight for the scanning cylinder 80 sweeps ninety degrees from its zero position to the left of vertical [FIG. 9a] toward the center of the cylinder [FIG. 9d] in one-sixth of a second so that zero degrees is nearly at vertical and ninety degrees is nearly at horizontal—the line of sight 223 starts to the right of vertical and scans from right to left as will be understood);

4. Sweep angle of the center line of sight 224=twenty degrees (this sweep begins at ten degrees on one side [the rear side 52 in the disclosed embodiment] of a vertical line and ends at ten degrees on the opposite side [the front side 54 in the present embodiment] of the vertical line; in other words, from the vantage point of a user sitting at the keyboard 36, the center line of sight 224 begins its sweep at a zero count ten degrees inward toward the display 42 from a vertical line, sweeps outward toward the user into a vertical position and continues sweeping toward the user for ten degrees out from the vertical position);

5. Pulse rate of counter 26=5,000 counts per second (Dividing this pulse rate by the speed of rotation, 5000/6= 833.3 counts or divisions per one ninety-degree sweep of the left and right lines of sight 222 and 223; since the center line of sight 224 sweeps through twenty degrees while the left and right lines of sight are sweeping through ninety degrees, the number of counts or divisions for the center sweep is 20/360×833.3 or 46.3 counts during the twenty-degree sweep of the center line of sight);

Continuing the example, during a single cycle of rotation of the scanning cylinders 80, 82, and 84, it is assumed that the following angle count values are obtained, having reference to FIGS. 13, 14a–c, and 15. The triangle of FIG. 14a represents the triangle formed by the finger 225 and the detectors 130 and 132 in the x and y dimensions, and the triangle of FIGS. 14b and c represents the z dimension triangle.

Left angle 270 (or A) count = 234 pulses

Right angle 272 (or B) count = 576 pulses

Center angle 274 (or Z) count = 12 pulses

Cycle end count = 833 pulses

Therefore, using basic triangulation formulas, $$\text{The left angle}(270 \text{ or } A) = 90 - \left(90 \cdot \frac{234}{833}\right) = 64.7°$$

$$\text{The right angle}(272 \text{ or } B) = 90 - \left(90 \cdot \frac{576}{833}\right) = 27.8°$$

$$\text{The center angle}(274 \text{ or } Z) = 20 - \left(20 \cdot \frac{12}{46}\right) = 14.8°$$

Using the foregoing values, the x, y, and z coordinates of the finger 225 in the coordinate system in the field 190 are calculated using basic triangulation as follows (FIGS. 13 and 14):

A=64.7°
B=27.8°
C=87.5°
Z=14.8°
c=30 cm

Find x, y, and z, as follows:

Step 1.
$$a = \frac{SIN(A) \cdot c}{SIN(C)}$$
$$= \frac{SIN(64.7) \cdot 30}{SIN(87.5)}$$
$$= \frac{0.9041 \cdot 30}{0.999}$$
$$= 27.15 \text{ cm}$$

Step 2.
$$y = \frac{SIN(B) \cdot a}{SIN(A)}$$
$$= \frac{SIN(27.8) \cdot 27.15}{SIN(90)}$$
$$= \frac{0.4664 \cdot 27.15}{1}$$
$$= 12.66 \text{ cm}$$

Step 3.
$$x = \frac{SIN(90 - A) \cdot y}{SIN(A)}$$
$$= \frac{SIN(90 - 64.7) \cdot 12.6}{SIN(64.7)}$$
$$= \frac{SIN(25.3) \cdot 12.66}{SIN(64.7)}$$
$$= \frac{0.4274 \cdot 12.66}{0.9041}$$
$$= 5.98 \text{ cm}$$

Step 4.
$$z = \frac{SIN(Z) \cdot y}{SIN(90 - Z)}$$
$$= \frac{SIN(14.8) \cdot 12.66}{SIN(90 - 14.81)}$$
$$= \frac{SIN(14.8) \cdot 12.66}{SIN(75.2)}$$
$$= \frac{0.2554 \cdot 12.66}{0.9668}$$
$$= 3.34 \text{ cm}$$

Therefore, the cursor x, y, z coordinates respectively are: 5.98 cm, 12.66 cm, and 3.34 cm.

From the foregoing it will be apparent that the x and y position of the user's finger 225, or other object, in the field 190 is translated to the cursor 40 of the display 42. Since the position of the finger is updated six times a second, the cursor moves on the screen very smoothly relative to the movement of the user's finger. These parameters can be changed, however, in order to change the responsiveness of the cursor to the finger's movement.

Also, it will be understood that movement of the user's finger 225 into the field 190, that is, toward the display 42 when the scanner 22 is between the keyboard 36 and the monitor 42, is comparable to clicking the conventional mouse. In other words, movement of the user's finger in x and y directions in the plane of the field causes comparable movement of the cursor on the display, whereas movement of the user's finger into and out of the field or merely transversely of the plane of the field, causes the cursor to be activated in order to select a position for the cursor on the display, such as to position the cursor between the letters of a word in a word processing program, or to select an icon or a command. Moving the finger transversely of the plane of the field once is comparable to single-clicking the mouse, and moving the finger transversely twice is comparable to double-clicking the mouse.

Such selecting movement of the user's finger is done quickly to produce rapidly changing pulse counts from the timing pulses 264. The signal processor 28 uses this rate of change or other well-known signal processing techniques to produce a z term for activating the cursor to make the desired selections.

Although the scanner 22 has been shown and described as including three cylinders 80, 82, and 84 for determining x, y, and z coordinates, it is to be understood that the scanner could include only the left and right, i.e., only two, cylinders 80 and 82 to obtain only the x and y coordinates while a button-operated switch, not shown but similar to a conventional mouse, could be used to provide the z coordinate.

ALTERNATIVE EMBODIMENTS

Scanner. Various sources of radiant energy could be used besides active infra-red, including passive infra-red emissions, low-power laser light, ultrasonic waves, visible light, high frequency emissions such as radar or microwaves, or any source of low spreading radiant energy which can be discriminated from external sources and blinded by the cylinders 80, 82, and 84. However, several of these alternatives are more costly and/or more dangerous types of emission.

The positions of the emitters 176, 178 and detectors 130, 132 and 140 could be reversed whereas the view of the emitters is restricted and scanned and the detectors are open. Fixed detectors in the place of the emitters would receive reflections only when the emitters sweep and reflect off an object or finger, as 225. The left and right signals would be differentiated using different modulations of the frequencies used. Also, the use of multiple detectors or receivers on the scanner 22 would provide greater range and increased sensitivity to multiple reflective objects.

As described above, the lines of sight 222 and 223 perform their scans substantially simultaneously, but it need not be so since the lines of sight may alternate in their views. Also, the cylinders 80, 82 and 84 are mounted to rotate in phase, that is, in the same timed relationship, but they can rotate out of phase.

As disclosed above, the positions of the lines of sight 222 and 223 are measurable by measuring time from a fixed point on the cylinders 80 and 82, that is the point where the line of sight is when a reflection is received, by using the 24 clock and the counter 26. Instead, time can be measured by using a draining capacitance, by using an external computer, or by using any stable measurable source. Still further, the position or view controlled by the cylinder is measurable or known by measuring the resistance of a fixed potentiometer geared or incorporated into the scanner or by sweeping at a known fixed rate.

Scanning or sweeping can take place by blocking the detectors 130, 132 and 140 as disclosed except for a narrow line of sight 222, 223 and 224 or by having open reception with sweeping blockers such as transparent cylinders with opaque helical lines rather than the slots 88. In such an embodiment, the detectors are activated by the emissions all the time, except when blocked by the opaque line.

Sweeping may also be accomplished electronically by a liquid crystal display, not shown, wherein pixels on the display are sequentially blocked or opened to scan the field for the detector so that the LCDs would replace the slotted cylinders 80, 82 and 84. Although more costly, such a scanner could be made smaller for use in laptop computers and would award moving parts. Multiple receivers might be required to provide better definition of reception. By using finite sweeping liquid crystal displays, the same end objective can be achieved to provide ultra small components for use in laptop computers or home computers.

Also, mirrors could be used to achieve sweeping. That is, the same sweeping action of the lines of sight 222 and 224 as described above can be achieved by rotating mirrors reflecting to detectors or receivers, or by the use of lenses, but such optics are more expensive and require more moving parts. Moreover, the emitters 176, 178 or detectors 130, 132, 140 could be mounted to sweep the field although such a design would be less durable. Nevertheless, sweeping of the lines of sight could be accomplished by sweeping the infra-red emitters to reflect back to fixed detectors, in static alternating or pulsed fashion, or by using multiple frequencies of emission. The subject apparatus can be constructed by directing emission to controlled reception, or by controlling emission to a fixed reception or detector. Due to the nature of light spreading, however, controlled reception is more suited to the apparatus as it requires little or no lensing.

It is to be noted that small microswitch buttons could be placed on the scanner housing 50 to provide additional input and that a simple cord or transmitter could be employed to transmit data from the apparatus 20 to the computer.

Also, different plastic or glass lenses or filters may be used within the apparatus to filter out light, other than the desired response light, and provide a finished outer appearance to the device.

Computer. The software program in the converter 30 is adaptable for any size monitor 42 up to the field 190 depth and beyond so that the user may obtain a very high definition on a small monitor by setting the scanning field to be large. Thus, large movements within the field of the finger or other object 225 will result in small cursor movements on the monitor. By setting the field small, fast but perhaps less accurate positioning occurs, whereas small motions within the field are amplified to large cursor movements.

Although a preferred embodiment of the present invention has been shown and described, and alternate embodiments of several parts have been described, various modifications and substitutions may be made thereto without departing from the spirit and scope of the invention. Accordingly, it is to be understood that the present invention has been described by way of illustration and not limitation.

What is claimed is:

1. An apparatus for determining the position of an object in an area of free space adjacent to a plurality of reference points spaced along a reference line, comprising:

radiant energy detectors located at each of the reference points;

revolving scanning cylinders associated with each reference point, each of the cylinders including a slot extending therearound through which radiant passes for controlling the transmission of radiant energy to and from the radiant energy detectors along a scan line extending out from its associated reference point while such scan line is sweeping through an angle centered at its reference point from a starting position spaced from an object in the area to a position where it intercepts an object in the area, the radiant energy detectors being capable of producing a signal associated with each reference point when its scan line intercepts the object, whereby the time elapsed between each of said starting positions and the production of its respective signal is proportional to the magnitude of the angle traversed by its scan line;

a converter capable of converting each signal into said magnitude of the angle traversed; and a calculator capable of calculating the coordinates of the object in the area from said angles and the distance between the reference points.

2. The apparatus of claim 1, wherein the slot in each cylinder is helical; and wherein a cover is interposed each cylinder and said area and has a straight slot disposed transversely of the helical slot in its respectively adjacent cylinder so that transmission of radiant energy between the detectors at each reference point and the object is allowed only along a line of sight when the detector and its associated helical slot and straight slot and the object are aligned.

3. The apparatus of claim 2, wherein there are motors for rotating the cylinders so as to move the scan lines through their angles and to establish said lines of sight with an object in the area during each revolution of the cylinders.

4. The apparatus of claim 1, wherein there are at least three reference points along said reference line with one of the reference points being a third point between first and second points;

wherein the scanning cylinders cause the scan lines associated with the first and second reference points to be scanned in a predetermined plane in x and y dimensions of a coordinate system and cause the scan line associated with the third reference point to be scanned in a plane transversely of said predetermined plane and in the z dimension of the coordinate system; and wherein the calculator is capable of calculating the x, y and z coordinates of the object in the area.

5. The apparatus of claim 4 for use with a display having a controlled graphic symbol, wherein there is a converter for converting the coordinates into signals for activating the graphic symbol of a display in x, y and z dimensions on the display in response to movements of the object in x, y and z dimensions in the area.

6. An electro-optical scanning mechanism, comprising:

an elongated housing having a cover provided with longitudinally extending upper slots spaced therealong, cylinders rotatably mounted in the housing adjacent to the cover and having lower slots respectively adjacent to and in alignment with the upper slots during rotation of the cylinders, radiant energy means in the cylinders enabling radiant energy to be transmitted through the upper and lower slots, where they are aligned, between the radiant energy means and the outside of the housing and to be blocked from such transmission where the slots are not aligned, and means for rotating the cylinders so as to achieve such alignment at least once during each revolution whereupon the radiant energy means produces a signal, the time of which is an indication of the number of degrees of revolution of the cylinders from a predetermined start position to a position of alignment or misalignment of the slots and the radiant energy means.

7. The scanning mechanism of claim 6, wherein the slot in the cylinder is helical so that the upper and lower slots are always in alignment where they overlap.

8. The scanning mechanism of claim 6, wherein the slot in one of the cylinders is a straight slot whereby the upper and lower slots are aligned only once during each rotation of the cylinders.

9. The scanning mechanism of claim 6, wherein there are three upper slots, wherein there are at least three cylinders in axial alignment each adjacent to a slot in the cover, wherein the lower slots in the outermost cylinders are helical so that the upper and lower slots are always in alignment where they overlap, and wherein the slot in the middle cylinder is a straight slot whereby the upper and lower slots are aligned only once during each rotation of the cylinders.

10. The scanning mechanism of claim 6, wherein the radiant energy means are detectors.

11. The scanning mechanism of claim 10, further including:

means for emitting radiant energy in a field adjacent to the housing and from which said energy is transmitted.

12. The scanning mechanism of claim 6, further including:

means for producing a signal upon completion of each revolution of the cylinders.

13. An apparatus for activating an element on a display in response to the presence of an object in a predetermined area spaced from the element, comprising:

means for cyclically generating a train of timing signals;

means for counting the signals generated;

means for cyclically scanning said area for the presence of an object and for producing a triggering signal in response to the reception of energy reflected from the object;

means for synchronizing the scanning and generating cycles so that they both start at the same time;

means responsive to the triggering signal for interrupting the counting of said timing signals so that the number of timing signals counted in a given cycle is a function of the time between the start of the scanning cycle and the receipt of the reflected energy from the object; and means for activating the element of the display as a function of the number of timing signals counted.

14. An apparatus for controlling a graphic element on a display in response to movement of a user's finger in free space along x, y and z dimensions of a first multi-dimensional coordinate system, wherein the graphic element is capable of being activated along x, y and z dimensions of a second multi-dimensional coordinate system of the display but which correspond to the x, y and z dimensions of the first system, comprising:

means for generating a plurality of trains of angle pulses respectively associated with said dimensions and a fourth train of cycle pulses;

means for counting the pulses in each of the trains and for respectively storing the counted pulses from each of said trains;

first, second and third infrared sensor means respectively located at spaced reference points along a reference line and capable of respectively generating first, second and third triggering signals when exposed to infrared energy;

infrared emitter means for generating a field of reflective energy in a predetermined plane that includes said reference line, whereby an object in the field is in a triangular relationship with any two of said sensors and whereby energy is reflected from such an object toward the sensors;

scanning means respectively associated with the sensor means for cyclically scanning the field through an angle in said plane whose apex is at its respective sensor means and for exposing its respective sensor means to the energy reflected from the object at predetermined intervals during each scanning cycle, each of said sensor means being capable of generating a triggering signal at each of said intervals so that the time delay between the start of each cycle and said exposure of each sensor means is a function of the angle between the reference line and a line of sight between the respective sensor means and the object;

means for transmitting said first, second and third triggering signals to the counting and storing means so as respectively to interrupt the counting of the first, second and third trains of pulses and to store the number of pulses counted during each cycle whereby the numbers of pulses stored are respectively functions of the number of degrees in said angles;

means for calculating the lengths of the sides of a triangle from the angle values stored in the counting and storing means;

means for generating an end count triggering signal responsive to the completion of each scanning cycle and for transmitting the end count signal to the counting and storing means in order to interrupt the counting of the pulses in the fourth train and for transmitting input signals to the calculating means representative of the scanning angles registered in each cycle;

means for developing control signals for controlling the graphic element of a display in response to said pulses stored in the counting and storing means from the signals representative of said lengths.

15. A method of controlling a graphic element in a multi-dimensional coordinate system on a display, comprising:

generating a train of timing pulses for each dimension in said coordinate system, counting the pulses in each of said trains, establishing a predetermined area of space separate from the display into which a controlling object may be placed and moved about, developing triggering signals in response to energy reflected from an object in the area and representative of movements of the object in a multi-dimensional coordinate system in the area which corresponds to the coordinate system of the display, interrupting the trains of timing pulses being counted in response to the triggering signals, the final count of pulses in each train being representative of the movement of the object in the area in corresponding dimensions of the coordinate system of the area, and creating control signals in response to the final count of each train of pulses for controlling the graphic element of a display in selected dimensions of the coordinate system of the display.

16. The method of claim 15, wherein there are a plurality of reference points along a reference line adjacent to the area, wherein a triggering signal is developed when a line of sight at each reference point completes its scan from a starting time that is synchronized with the start of the generation of each train of timing pulses to the time it intersects with the object, and wherein the trains of timing pulses being counted are interrupted by their respective triggering signals so that the final count of pulses in each train is representative of said intersecting times.

17. The method of claim 15, wherein the developing involves cyclically scanning the field from a pair of reference points spaced along a reference line and said triggering signals are developed from reflections from the object at said reference points whereby the time of receipt of each signal during each cycle of the scan corresponds to the angle between a line of sight to the object and the reference line, synchronizing the start of each scan with the start of counting the pulses, and wherein the interrupting involves interrupting the counting of the pulses with the triggering signal whereby the number of pulses counted in each train corresponds to said angles.

18. The method of claim 17, wherein the field is scanned in a predetermined dimension from said reference points, and wherein the developing further involves cyclically scanning the field transversely of said predetermined dimension from a third reference point intermediate the pair of reference points.

19. An electro-optical scanning mechanism, comprising:

an elongated housing having a cover provided with longitudinally extending upper slots spaced therealong, cylinders rotatably mounted in the housing adjacent to the cover and having lower slots respectively adjacent to and in alignment with the upper slots during rotation of the cylinders, a radiant energy detector in each cylinder enabling radiant energy to be received through the upper and lower slots, where they are aligned, from the outside of the housing to the detector and to be blocked from such reception where the slots are not alignment, and a rotational driver adapted to rotate the cylinders so as to achieve such alignment at least once during each revolution whereupon the radiant energy detector produces a signal upon receipt of radiant energy, the time of which is an indication of the number of degrees of revolution of the cylinders from a predetermined start position to a position of alignment or misalignment of the slots and the radiant energy detector.

20. An apparatus for activating an element on a display in response to the presence of an object in a predetermined area spaced from the element, comprising:

a generator adapted to cyclically generate a train of timing signals;

a counter operable to count the signals generated;

a scanner cyclically scanning said area for the presence of an object and produce a triggering signal in response to the reception of energy reflected from the object;

a timer synchronizing the scanning and generating cycles so that they both start at a predetermined time; and a signal processor responsive to the triggering signal and interrupting the counting of said timing signals so that the number of timing signals counted in a given cycle is a function of the time between the start of the scanning cycle and the receipt of the reflected energy from the object and activating the element of the display as a function of the number of timing signals counted.

21. An apparatus for controlling a graphic element on a display in response to movement of a user's finger or other passive object in free space along x, y and z dimensions of a first multi-dimensional coordinate system, wherein the graphic element is capable of being activated along x, y and z dimensions of a second multi-dimensional coordinate system of the display but which correspond to the x, y and z dimensions of the first system, comprising:

first generator generating a plurality of trains of angle pulses respectively associated with one of said dimensions and a fourth train of cycle pulses;

a counter and storage device counting the pulses in each of the train and respectively storing the counted pulses from each of said trains;

first, second and third infrared sensors respectively located at spaced reference points along a reference line and respectively generating first, second and third triggering signals when exposed to infrared energy;

infrared emitters generating a field of reflective energy in a predetermined plane that includes said reference line, whereby an object in the field is in a triangular relationship with any two of said sensors and whereby energy is reflected from such an object toward the sensors;

scanners respectively associated with each sensor cyclically scanning the field through an angle in said plane whose apex is at its respective sensor and exposing its respective sensor to the energy reflected from the object at predetermined intervals during each scanning cycle, each of said sensors generating a triggering signal at each of said intervals so that the time delay between the start of each cycle and said exposure of each sensor is a function of the angle between the reference line and a line of sight between the respective sensor means and the object;

a transmitter transmitting said first, second and third triggering signals to the counter and storage device, respectively interrupting the counting of the first, second and third trains of pulses, and storing the number of pulses counted during each cycle whereby the numbers of pulses stored are respectively functions of the number of degrees in said angles;

a calculator calculating the lengths of the sides of a triangle from the angle values stored in the counter and storage device;

a second generator generating an end count triggering signal responsive to the completion of each scanning cycle and transmitting the end count signal to the counter and storage device thereby interrupting the counting of the pulses in the fourth train and transmitting input signals to the calculator representative of the scanning angles registered in each cycle; and a controller developing control signals that control the graphic element of a display in response to said pulses stored in the counter and storage device from the signals representative of said lengths.

* * * * *